Oct. 18, 1949.　　　C. B. CRAWFORD　　　2,484,815
TUBE COUPLING
Filed Aug. 15, 1947

INVENTOR.
CULLEN B. CRAWFORD
BY Fay, Golrick & Fay
ATTORNEYS

Patented Oct. 18, 1949

2,484,815

UNITED STATES PATENT OFFICE 2,484,815

TUBE COUPLING

Cullen B. Crawford, Cleveland, Ohio, assignor to Crawford Fitting Company, Shaker Heights, Ohio, a corporation of Ohio Application August 15, 1947, Serial No. 768,798

3 Claims. (Cl. 285—122)

This invention relates to a tube coupling means and more particularly it relates to a coupling assembly for a tube end wherein a tapered sleeve interposed between a coupling body and a nut is adapted, when subjected to axial pressure, to enforce a clinching grip upon a tube by means of a swaging action of the sleeve upon the tube wall.

A principal object of my invention is to provide an integrated fitting assembly wherein the individual components are inherently self-aligning, and which is adapted to receive a tube end in coupling relationship without the necessity of separate application of the components upon the tube prior to engaged assembly as is now the conventional practice.

Another purpose of my invention is to provide a coupling designed to enforce a clinching grip upon a tube which will not cut into the tube wall or otherwise impair the durability or functional usefulness of the tube. This is achieved by predetermined limitational control of the clinching force and by the sleeve design which permits swaging action.

Another object is to provide a coupling assembly which will be substantially moisture proof and free of air pockets when engaged upon a tube end under pressure application.

To the accomplishment of the foregoing and related ends, the invention, then, consists of the means hereinafter fully described and pointed out in the claims, the annexed drawings and the following description setting forth in detail certain mechanism embodying the invention, such disclosed means illustrating, however, but two of various ways in which the principle of the invention may be used.

Figure 1:
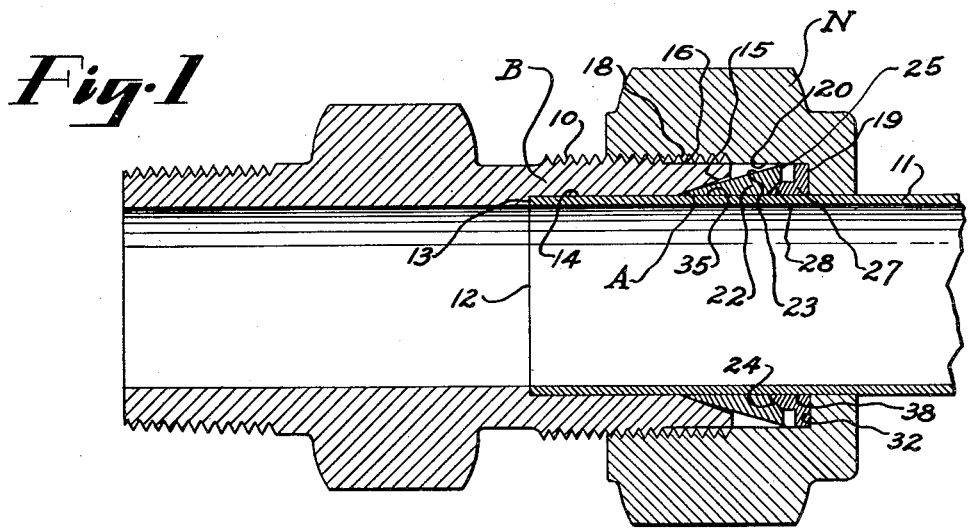
Figure 2:
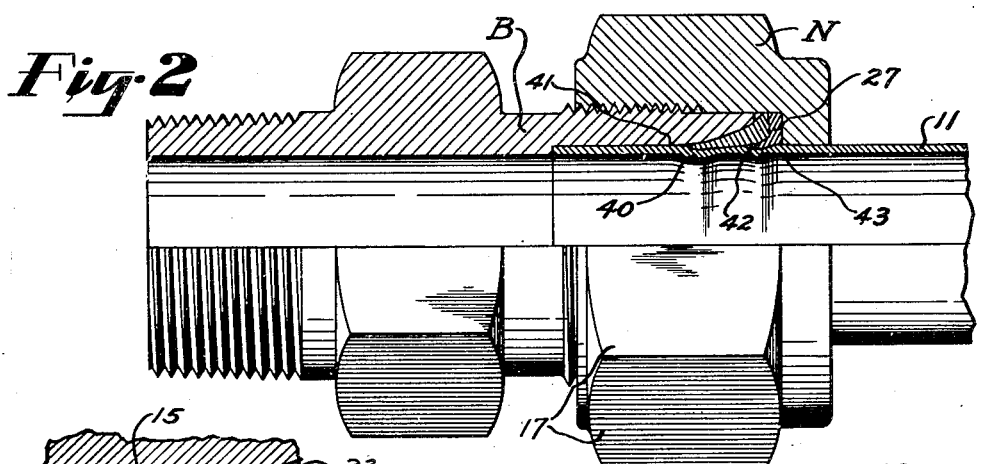
Figure 5:
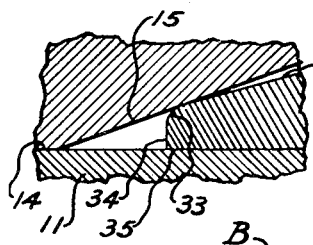
Figure 4:
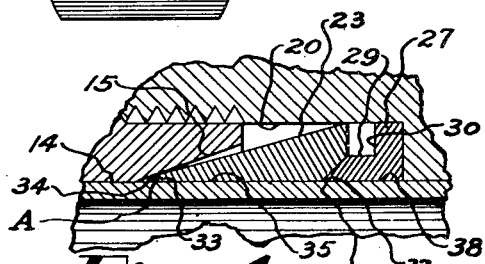
Figure 3:
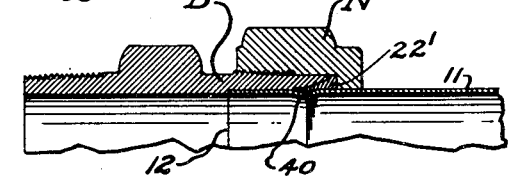

Fig. 1 is a longitudinal section of a double sleeve coupling assembly upon a tube with the components of the coupling in non-pressure or finger-tight contact; Fig. 2 is a similar view of the upper part of the assembly under pressure application, with the lower half being shown in elevation; Fig. 3 is a fragmentary longitudinal section showing an assembly employing a single sleeve under pressure application; Fig. 4 is greatly enlarged fragmentary section of the sleeves, nut and mouth in non-pressure contact as shown in Fig. 1; and Fig. 5 is an enlarged fragmentary view of the apicad portion of the front sleeve seated in the flared mouth in initial non-pressure contact.

Before turning to a description of the details of my coupling assembly, it should be pointed out that my invention is concerned with the refinements of sleeve and coupling unit design which provide a coupling assembly that will effect through swaging action a clinching grip upon a tube, without cutting the tube wall or appreciably deforming it. I am aware of the various attempts by previous inventors to accomplish a coupling joint either by a biting, cutting grip of the sleeve upon a tube, or by radial compression of the tube. While satisfactory for certain types of fittings, these gripping methods have certain very definite limitations for high pressure coupling and for those where vibration is a matter of concern, for reasons well known to those skilled in the art.

In the drawings, there is shown a hollow cylindrical coupling body B having an externally threaded portion 10 adapted to have threaded thereon a conventional coupling nut N through which a tube 11 enters in the usual manner. The end 12 of the tube 11 is adapted to engage against an internal abutment 13 in the coupling body. The internal surface 14 of the coupling body adjacent the abutment 13 is cylindrical for a portion of its length and terminates in a frusto-conical portion 15 which constitutes a flared mouth.

The coupling nut N is adapted to fit slidably over the tube 11 and has an external torque surface 17 to provide a wrench hold thereon. The nut is provided with a threaded internal portion 18 which is adapted for engagement with the threaded portion 10 of the coupling body. Within the nut there is a flat abutting shoulder 19 which is adapted to contact the base of a sleeve which will be described in detail below. The internal surface 20 of the nut between the abutting shoulder 19 and the threaded portion 18 is cylindrical in form.

Interposed between the cylindrical coupling body and the nut is a front sleeve 22 having the form of a cylindrically hollow right circular conical frustum which encircles the tube and is adapted to fit slidably thereon. The external tapered or lateral surface 23 of the sleeve is shown to have an axial length greater than the axial length of the flared mouth 15 and has a taper slightly less than the taper of the flared mouth.

In practice I have found that an angular difference of approximately 10° between the taper of the flared mouth of the body and the taper of the front sleeve is desirable, although the range of variation may be from 5 to 15°. By this taper difference of 10 degrees is meant, of course, that the total included conical angle is of this amount or that the angular difference on each side of the longitudinal axis of the coupling is approximately 5 degrees, as is illustrated in the angular relationship shown in the drawings in Figs. 1, 4 and 5. The apicad or forward portion A of the lateral surface 23 of the sleeve is relatively thin and of an external diameter slightly greater than the minimum diameter of the flared mouth 15 so that, in initial non-pressure contact as shown in Figs. 1 and 4, this portion will seat near the minimum diameter or smaller end of the flared mouth. The front sleeve 22 also has a chamfered orifice surface 24 extending inwardly from the base 26.

In contact with the front sleeve 22 is a second or back sleeve 27 adapted to fit slidably upon the tube and which has a frusto-conical or external tapered surface 28 terminating in a relatively thin apicad portion a. The taper of this frusto-conical portion 28 is approximately that of the taper of the chamfered orifice surface 24 of the front sleeve, but should not be greater than the taper of the latter surface. The axial length of this frusto-conical surface 28 of the back sleeve is approximately equal to the axial length of the chamfered orifice surface with which engagement is intended. The axial length of each of these surfaces should be less than the axial length of the flared mouth of the coupling body. Adjacent the frusto-conical surface 28 of this sleeve is an intermediate cylindrical surface 29 having a diameter substantially equal to the maximum diameter of the chamfered orifice surface 24. The back sleeve also has a right circular cylindrical flange 30 adjacent the intermediate cylindrical surface 29. The surface 32 of the base of the back sleeve is adapted for engaging contact with the abutting shoulder of the coupling nut.

While I have shown the back sleeve 27 having an intermediate cylindrical surface 29, and prefer to employ this design so that the apicad portion a will not deform the tube wall unduly under coupling pressure, the frusto-conical surface 28 of the sleeve could extend to the flange, with the elimination of the intermediate cylindrical surface.

The apicad portion A of the front sleeve 22 which is adapted for engagement into the flared mouth 15 of the body has a convex curvature 33 at the termination of the lateral surface 23 of the sleeve and has a flat surface 34 perpendicular to the longitudinal axis of the sleeve of relatively minute extent between the curved surface 33 and the internal cylindrical surface 35 of the sleeve.

By way of illustration, in a fitting adapted for use upon one quarter inch tubing, I have found that the flat surface 34 between the internal cylindrical surface of the front sleeve and the curved surface may be in the order of .005 of an inch in extent and the radius of the curved surface 33 adjacent thereto may also be .005 of an inch. The circle of which said curved surface is a segment will be tangent to the frusto-conical lateral surface. These measurements may, of course, be varied somewhat within certain limiting factors of relationship.

The radial thickness of the front sleeve 22 at the point of tangency between curvature and tapered surface must be such that only a swaging action of the sleeve will result upon the application of axial pressure. If this radial thickness is too great the inward end of the sleeve will bite into the tubing and throw up a chip, as it were, forward of the bite. If the radial thickness is too thin no swaging or scraping action will result upon the surface of the tube.

I have found that if the radial thickness of the sleeve at the point of tangency between the curved surface and the tapered surface is such that the sleeve will seat in the flared mouth of the coupling body at a point between one third and one fifth along the axial length of the flared mouth measured from the intersection of the frusto-conical and cylindrical surface of the coupling body, the desired swaging action may be achieved. In practice I have limited the radial thickness to such amount that the sleeve seats at a point approximately one-fifth along the axial length of the mouth.

Another way of expressing the desired thickness of the sleeve 22 at the particular tangency point under consideration is its relationship to the axial distance between the intersection of cylindrical and frusto-conical surfaces of the coupling body and the forward flat surface of the sleeve when the sleeve is seated in finger-tight contact in the mouth. I have found that the ratio of the radial thickness to this axial distance should be approximately in the order of one to three or one to three and a half.

The apicad portion a of the back sleeve also has a flat surface 37 perpendicular to the longitudinal axis thereof and of relatively minute extent between the frusto-conical surface 28 and the internal cylindrical surface 38 of the sleeve. As an illustration of the extent of this flat surface, I have found that in a fitting adapted for ¼ inch tubing, a flat surface of between .005 and .010 is desirable to accomplish the scraping, swaging action to be more fully explained below.

It should also be noted that the diameter of the external cylindrical surface 16 of the coupling body adjacent the mouth thereof, and the external diameter of the flange of the back sleeve, and the maximum diameter of the front sleeve are all approximately equal, and are of a diameter just less than that of the internal diameter of the cylindrical surface 20 of the nut adjacent the abutting shoulder. This is provided so that there will be no looseness in the assembled fitting, and so that, upon pressure application, when the sleeves are, in effect, telescoped between the coupling members as shown in Fig. 2, the space between the members is almost entirely taken up.

In preparation for coupling operation, the body, nut and sleeves are assembled in the relationship shown in Fig. 1 with the coupling nut being turned upon the threaded portion of the body to a finger-tight position. The sleeves will automatically center themselves in axial alignment to each other and to the flared mouth of the body since the flat shoulder of the nut through which pressure is exerted is perpendicular to the axis of the assembly. The tube end may then be inserted into the assembly and the nut turned upon the threaded portion of the body under increased pressure for a turn and a half or thereabouts to accomplish the joint.

Pressure exerted in an axial direction by the flat shoulder of the nut against the flange of the back sleeve will urge the frusto-conical surface of the back sleeve into frictional engagement with the chamfered orifice surface of the front sleeve. Since this area of engagement is considerably more than the contacting area of the apicad portion of the front sleeve in the flared mouth, it is believed that the lateral or tapered surface of the front sleeve will be urged forward into the mouth in straight-forward fashion to take up the angular taper difference between the two surfaces and form a sealing contact throughout the axial length of the flared mouth.

This forward action of the front sleeve forces the apicad portion A thereof through the mouth of the body and swages this portion between the tube wall and the internal cylindrical surface of the coupling body, thereby enforcing a clinching deformation or contraction upon the wall of the tube as shown generally at 40. The flat surface 34 of the apicad portion of the front sleeve scrapes a thin surface layer of the tube wall and flows it inwardly to provide a sealing contact between the tube wall and internal cylindrical surface of the body at 41. It should be noted that the apicad portion of this sleeve is itself swaged or flowed inwardly and squeezed thin, as the sleeve is progressively contracted upon the tube from the apicad portion rearwardly toward its trailing end as shown in Figs. 2 and 3.

During this forward motion of the front sleeve it should be pointed out that the curved surface 33 of the apicad portion facilitates the initial travel of the sleeve through the mouth and reduces the possibility of scoring the mouth or otherwise damaging the body. While a swaging action of the sleeve can be accomplished with a sleeve not having a curved surface between the flat and tapered surfaces, I have found that a more satisfactory engagement is achieved when a curved surface is utilized.

When the lateral surface of the front sleeve is thus forced into sealing frictional engagement throughout the length of the flared mouth, the apicad portion $a$ of the back sleeve is in turn swaged through the orifice surface of the front sleeve upon the continued application of axial pressure. The flat surface 37 of the apicad portion skims or scrapes the surface of the tube wall to flow a portion into sealing contact 42 against the internal surface of the front sleeve. As the apicad portion is swaged forward and the sleeve is progressively contracted upon the tube, the internal cylindrical surface of the front sleeve and nut restricts outward expansion, and hence the apicad portion effects a clinching grip upon the tube by inflicting an extended annular restriction or progressive contraction upon the tube as shown generally at 43.

Continued tightening of the nut brings the flange of the back sleeve into contact with the base 25 of the front sleeve, thereby restricting further inward movement. When this contact is made, one tightening the nut will immediately notice a great increase in the torque pressure required to turn the nut. When this increase is noted, the joint is completed and no further turning is required.

The resulting joint shown in Fig. 2 is shown to be substantially free of air pockets and, has proven to be substantially moisture-proof. Sealing contact is provided at a plurality of surfaces, and experiments have indicated that the resulting joint is effective for pressures of several thousand pounds.

In Fig. 3 I have shown a coupling assembly wherein a single sleeve 22', similar in form to the front sleeve 22 described in detail above except that the chamfered orifice surface 24 is omitted, is employed. The joint resulting from the use of a single sleeve of the specified form is also a very effective one, particularly when the pressures to be withstood are of a lower order, and the multi-seal effect of the double sleeve construction is not needed.

An important result of the coupling relationship as shown in Fig. 2 is that there is provided a built-in sleeve, as it were, from the front of the back sleeve to the back of the nut, thus limiting the effects of vibration which are customarily felt at the point where the tube enters the nut.

Another advantage which results from the use of the two sleeves of the structure defined is that any torque effect resulting from the turning of the nut upon the body is eliminated before it effects the constancy of the seal of the front sleeve upon the tube. The back sleeve may rotate with the nut, but the difference in the amount of the frictional surface area between the two sleeves and the greater frictional area of engagement between the front sleeve and the mouth of the body prevents the turning of the front sleeve under pressure. The latter is merely swaged inwardly in a straightforward fashion, thus maintaining a constant seal at the inward portion of the fitting.

It is important to note that since the action of the sleeve on the tubing enforces only a clinching grip thereupon without damaging either the sleeve structure or the tube, the sleeves may be removed from the tube and reused several times. The clinching action of the sleeves permits my coupling assembly to be used advantageously on plastic or brittle tubing which are easily damaged under the biting or cutting engagement which many of the commercial couplings now available necessitate.

The individual components of my coupling assembly are all of the same material and hardness. I have found that a coupling assembly of standard commercial brass is satisfactory, although other materials may be used providing a swaging action of the sleeves may be achieved.

It is to be understood that the forms of my invention, herewith shown and described, are to be taken as preferred examples of the same, and that various changes in the shape and size of components may be resorted to without departing from the spirit of my invention or the scope of the claims that follow.

I, therefore, particularly point out and distinctly claim as my invention:

1. A coupling assembly for a tube end comprising: a tubular coupling body adapted to receive a tube end and having an internal shoulder against which the tube end is adapted to abut, the internal bore of said body extending outwardly from said shoulder being cylindrical through a portion of its length and terminating in a frusto-conical flared mouth; a sleeve adapted to fit slidably upon the tube and having the form of a cylindrically hollow, right circular conical frustum, the sleeve's tapered external surface having an axial length greater than the axial length of the flared mouth and having an included conical angle approximately 10° less than that of the included conical angle of the flared mouth, the apicad portion of the tapered surface having a convex curvature and being adapted to seat in said mouth adjacent to but spaced apart from the smaller end of said mouth in initial non-pressure contact at a point between one-third and one-fifth along the length of the flared mouth; and a coupling nut adapted to fit slidably over the tube and having an abutting shoulder therewithin adapted to engage the base of the sleeve, said nut being adapted to engage said coupling body for urging the sleeve axially along the tube into the flared mouth to swage the apicad portion of the sleeve through said mouth and simultaneously to contract said sleeve on to the tube progressively from the apicad portion of the sleeve toward its trailing end without cutting into the tube, thereby causing tube wall material to flow forwardly of the sleeve.

2. A coupling assembly for a tube end comprising: a tubular coupling body adapted to receive a tube end and having an internal shoulder against which the tube end abuts, the internal surface of said body being cylindrical through a portion of its length and terminating in a frusto-conical flared mouth; a front sleeve adapted to fit slidably upon the tube and having the form of a cylindrically hollow, right circular conical frustum, the sleeve's external tapered surface having an axial length greater than the axial length of the flared mouth and having an included conical angle approximately 10° less than that of the included conical angle of the flared mouth, the apicad portion of the sleeve's tapered surface being adapted to seat in said mouth adjacent to but spaced from the smaller end of said mouth at a point between one-third and one-fifth along the length of the flared mouth in initial non-pressure contact, said apicad portion having a curved face at the termination of the tapered surface, said sleeve also having a chamfered orifice surface extending inwardly from its base; a back sleeve adapted to fit slidably upon the tube and having an external frusto-conical tapered surface opposed to said chamfered orifice surface, said tapered surface of said sleeve having a taper angle substantially equal to that of the chamfered orifice surface, the taper angle of said latter two surfaces being substantially greater than that of said front sleeve's tapered surface, the apicad end of said back sleeve being adjacent to but spaced from the smaller end of said chamfered orifice, and means on said back sleeve for limiting the forward movement thereof through said chamfered orifice during coupling operation comprising an external intermediate cylindrical surface adjacent said tapered surface of the back sleeve, and a right circular flange adjacent said intermediate surface; and a coupling nut adapted to fit slidably over the tube and having an abutting shoulder therewithin substantially normal to the longitudinal axis of the nut adapted to engage the base of said flange of said back sleeve, said nut being adapted to engage said coupling body to move the co-acting sleeves axially of the tube and simultaneously to contract said sleeves on to the tube progressively from the apicad portion of each sleeve toward the trailing end without cutting into the tube, thereby causing the tube wall to flow forwardly of each sleeve.

3. A coupling assembly for a tube end comprising the structure characterized in claim 2, and with the apicad end of the sleeves having a flat surface intersecting the internal cylindrical surfaces of said sleeves and being substantially normal to the longitudinal axis of said coupling assembly, and with said intermediate surface of the back sleeve having a diameter approximately equal to the maximum diameter of said chamfered orifice, said back flange being adapted to contact the base of the front sleeve under coupling pressure thereby to limit the axial travel of said back sleeve through said chamfered orifice.

CULLEN B. CRAWFORD.

REFERENCES CITED

The following references are of record in the file of this patent:

UNITED STATES PATENTS

| Number | Name | Date |
|---|---|---|
| 2,158,757 | Knestermeier | May 16, 1939 |
| 2,349,180 | Lamont | May 16, 1944 |
| 2,405,822 | Franck | Aug. 13, 1946 |

FOREIGN PATENTS

| Number | Country | Date |
|---|---|---|
| 490,115 | Great Britain | Aug. 9, 1938 |